UNITED STATES PATENT OFFICE.

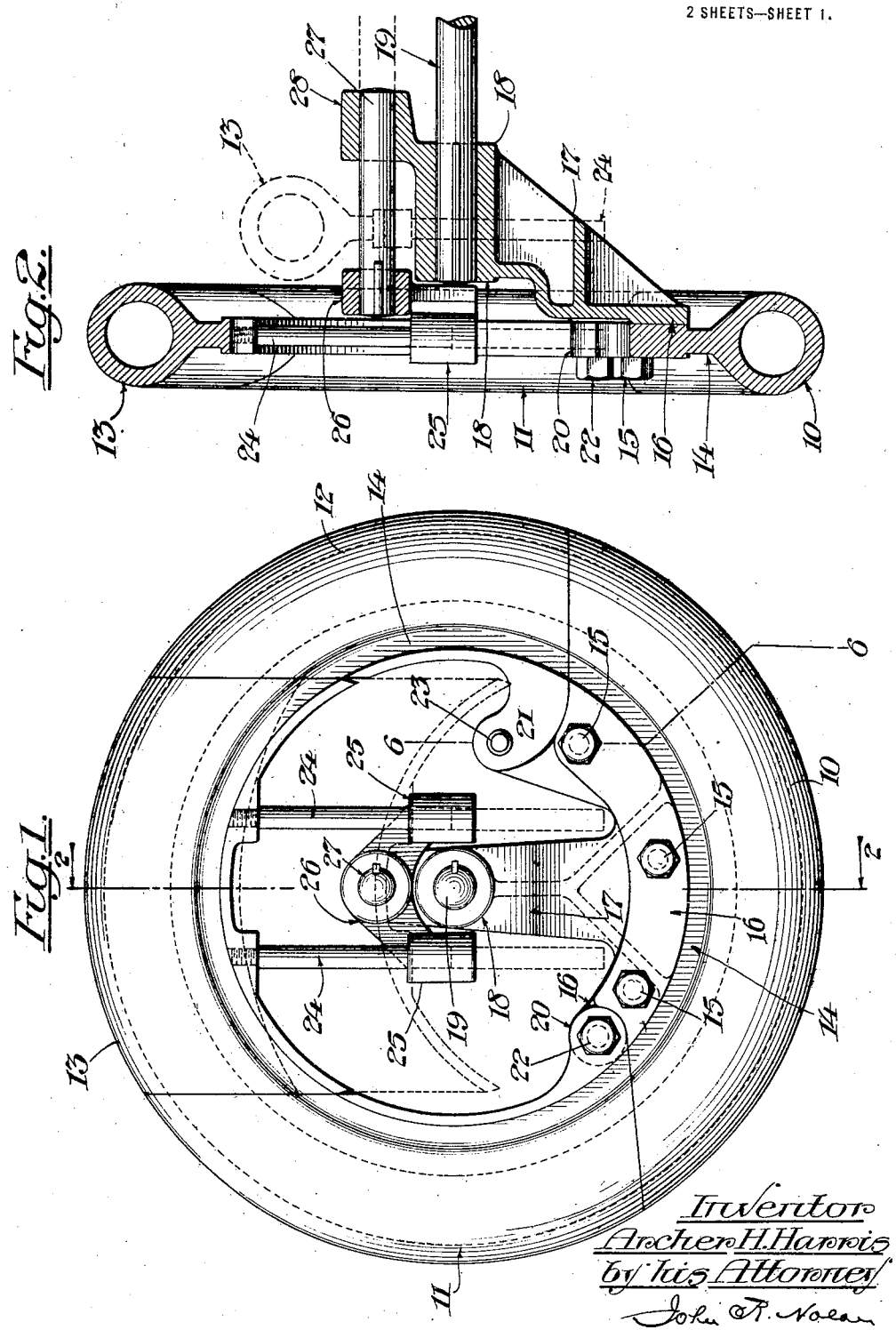

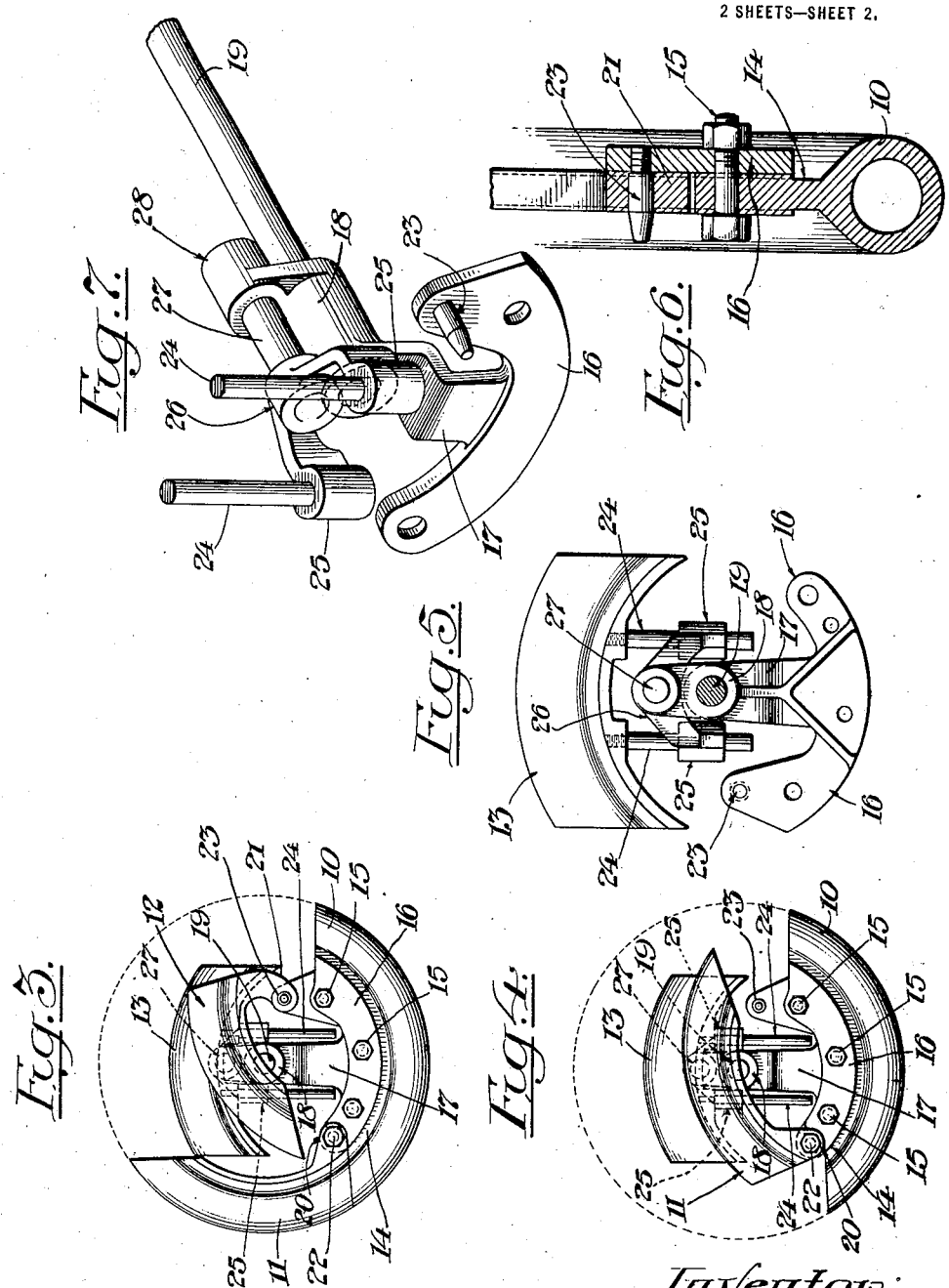

ARCHER H. HARRIS, OF BARBERTON, OHIO.

COLLAPSIBLE TIRE CORE.

1,426,865.　　　　　Specification of Letters Patent.　　Patented Aug. 22, 1922.

Application filed August 9, 1921. Serial No. 490,877.

*To all whom it may concern:*

Be it known that I, ARCHER H. HARRIS, a citizen of the United States, and resident of Barberton, in the county of Summit and State of Ohio, have invented certain new and useful Improvements in Collapsible Tire Cores, of which the following is a specification.

This invention relates to collapsible annular cores upon which tire shoes are constructed.

An object of my invention is to provide a tire-core having a series of segmental sections which are so constructed and supported in relation to each other that they can be rapidly collapsed or "broken" in a manner to facilitate the removal of the tire when it has been built up upon the core, and which sections can then be easily and quickly returned to their original position for a succeeding tire building operation.

A further object of my invention is to provide such a core which is effectually supported on a central axis of rotation and can thus be easily manipulated during the removal as well as the building of the tire.

With these objects in view my invention, generally stated, comprehends a collapsible tire-core embodying various novel features of construction and combinations of parts which will be hereinafter described and claimed.

In the drawings—

Figure 1 is a front elevation of a collapsible tire-core embodying the principle of my invention, showing the sections assembled and positioned to constitute an annular structure. In this view the key section is indicated in dotted lines as lowered and slid back beyond the plane of the core: this being the first step in the collapsing operation.

Fig. 2 is a vertical section through the structure, as on the line 2—2 of Fig. 1.

Fig. 3 is a front elevation showing the key section as lowered and retracted, and one of the hinged sections as swung inward, the latter step being the second in order.

Fig. 4 is a similar view with the said hinged section removed and the other hinged section swung inward; this being the next and final step.

Fig. 5 is a rear view of the main supporting bracket and the associated guide bracket for the rods of the key section.

Fig. 6 is a vertical section on a plane through the hinge connection of the removable swinging section, as on the line 6—6 of Fig. 1.

Fig. 7 is a perspective view of the brackets and adjuncts.

Referring to the drawings, 10, 11, 12 and 13 designate a series of relatively movable segmental sections which can be readily assembled and positioned to constitute a complete annular core upon which the tire can be built, and which sections can be as readily collapsed or "broken" to facilitate the effective removal of the tire therefrom.

In the preferred form of my invention herein illustrated the section 10, which may be termed the primary or base section, is provided with an internal web 14 which is bolted, as at 15, to the outer curved extension 16 of a radially-disposed supporting bracket 17 having an elongated hub 18 laterally of and in axial alinement with the core. This hub is keyed or otherwise held on the free end of a shaft 19 extending from a suitable stand. The sections 11, 12 which may be termed the second and third sections, respectively, are provided with suitably-disposed lugs 20, 21, which are pivoted at the respective ends of the extension, the extremities of the three sections adjacent the pivots being so formed that when the sections 11, 12 are in their outer position such extremities abut against each other and the peripheries of the latter sections are in circular relation to the periphery of the section 10. At the same time the free ends of the sections 11 and 12 are in spaced parallel relation to each other. The section 11 is permanently pivoted to the bracket extension 16 by means, for example, of a bolt 22, and the section 12 is detachably pivoted to said extension, preferably on a laterally-projecting stud 23 on the extension.

The section 13, termed a key section, is arranged diametrically opposite to the primary section 10. The key section has affixed thereto two inwardly extending parallel guide rods 24 which are slidably fitted to spaced bearings 25 on the respective arms of a bifurcated bracket 26, which is keyed or otherwise fixed on one end of a stem 27 extending above and parallel with the shaft 19, and being slidably fitted to a perforated guide projection 28 on the outer end of the hub 18 of the bracket 17. By this construction it will be seen that the section 13 may be moved in a rectilinear path within the interior plane of the core into position between the free ends of the sections 11, 12, as indicated by full lines in Figs. 1 and 2, so as to complete and maintain the circular relation of the series of sections, which thus constitute an annular core upon which the tire may be built up in the usual manner. When the tire has been constructed the section 13 can be moved inwardly in a rectilinear path away from the tire and toward the center of the core, as indicated by dotted lines in Fig. 1, and can then be bodily slid laterally from the plane of the tire, as indicated by dotted lines in Fig. 2, in order to permit the ready separation of the remaining sections from the tire in a manner hereinafter explained. In its movement toward the center of the core the section 13 is guided by the rods 24 in the bearings 25. When this section has reached the position indicated by the dotted lines in Fig. 1, it is slid laterally away from the plane of the core, and the stem 27 sliding through the guide projection 28 of the bracket 17, until the section is in the position indicated by the dotted lines in Fig. 2. This done, the section 12, pivoted on the stud 23, is swung inward to the position shown in Fig. 3, so as to be clear of the tire, and is then bodily removed from the stud, whereupon the pivoted section 11 is swung inwardly into the position shown in Fig. 4 so as to be entirely clear of the tire, thus permitting the ready removal of the built up tire from the remaining or primary section 10.

After the tire has been removed, the section 11 is swung to its outer position, the section 12 is again mounted on the stud 23 and swung to its outer position, and the section 13 is moved into the plane of the core. The sections are then turned on their common axis to position the section 13 below the center of the core and thus permit such section to drop into position between the sections 11, 12 and complete the annular formation of the core preparatory to the building of another tire thereon, and so on.

From the foregoing it will be seen that my invention provides a simple and convenient sectional core structure which is effectually supported during the building and the removal of the tire. Further, that the sections of the core can be rapidly brought into small compass in order to facilitate the removal of the tire, and can then be easily and quickly returned to their proper annular relation for a succeeding tire building operation.

It is to be understood that my invention is not limited to the specific details of construction herein disclosed, as the device may be modified in various respects within the principle of the invention and the scope of the appended claims.

I claim—

1. In a collapsible tire-core comprising hingedly connected sections and a removable key section therefor, a supporting element on one of said first-named sections, and slidable connections between the key section and the supporting element, said connections including means for guiding the key section in two rectilinear paths, one within the interior plane of the core and the other at right angles thereto.

2. In a collapsible tire-core comprising hingedly connected sections and a removable key section therefor, a supporting element on one of said first-named sections, slidable connections between the key section and the supporting element, said connections including means for guiding the key section in two rectilinear paths, one within the interior plane of the core and the other at right angles thereto, and a rotatable mounting co-axial with the core for said supporting means.

3. A collapsible tire-core comprising a primary section, a second section hinged at one end of the primary section, a third section detachably hinged at the opposite end of the primary section, a key section diametrically opposite to the primary section, and means for supporting the key section and guiding it in two paths, one within the interior plane of the core and the other at right angles thereto.

4. A collapsible tire-core comprising a primary section, a second section hinged at one end of the primary section, a third section detachably hinged at the opposite end of the primary section, a key section diametrically opposite to the primary section, a radial supporting element for the primary section, an axial mounting for said element, and slidable connections between the key section and the supporting element, said connections including means for guiding the key section in two paths, one within the interior plane of the core and the other at right angles thereto.

5. A collapsible tire-core comprising a primary section, a second section hinged at one end of the primary section, a third section detachably hinged at the opposite end of the primary section, a key section diametrically opposite to the primary section, a supporting element for the primary section, said element having an axial mounting laterally of the plane of the core and a guide adjacent said mounting, a bearing bracket supported in said guide and movable into and from the plane of the core, and a sliding connection between said bracket and the key section.

Signed at Cleveland in the county of Cuyahoga and State of Ohio this 29 day of July A. D. 1921.

ARCHER H. HARRIS.